US009711792B2

United States Patent
Asari

(10) Patent No.: US 9,711,792 B2
(45) Date of Patent: Jul. 18, 2017

(54) POSITIVE ELECTRODE ACTIVE MATERIAL FOR SECONDARY BATTERIES AND LITHIUM ION SECONDARY BATTERY USING THE SAME

(71) Applicant: HITACHI, LTD., Tokyo (JP)

(72) Inventor: Yusuke Asari, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 15/112,752

(22) PCT Filed: Mar. 10, 2014

(86) PCT No.: PCT/JP2014/056212
§ 371 (c)(1),
(2) Date: Jul. 20, 2016

(87) PCT Pub. No.: WO2015/136604
PCT Pub. Date: Sep. 17, 2015

(65) Prior Publication Data
US 2016/0344027 A1    Nov. 24, 2016

(51) Int. Cl.
*H01M 4/505* (2010.01)
*H01M 10/0525* (2010.01)
(Continued)

(52) U.S. Cl.
CPC ........ *H01M 4/505* (2013.01); *C01G 45/1228* (2013.01); *H01M 10/0525* (2013.01);
(Continued)

(58) Field of Classification Search
None
See application file for complete search history.

(56) References Cited

U.S. PATENT DOCUMENTS 4,980,251 A    12/1990   Thackeray et al.
5,599,435 A    2/1997    Li et al.
(Continued)

FOREIGN PATENT DOCUMENTS

JP    07-223819 A    8/1995
JP    07-235292 A    9/1995
(Continued)

OTHER PUBLICATIONS

International Search Report, mailed Jun. 3, 2014, which issued during the prosecution of International Application No. PCT/JP2014/056212, which corresponds to the present application.
(Continued)

*Primary Examiner* — Joseph D Anthony
(74) *Attorney, Agent, or Firm* — Baker Botts L.L.P.

(57) ABSTRACT

Provided is a positive electrode active material for lithium ion secondary batteries, having a crystal structure containing a layered $Li_2MnO_2$ structure with a high theoretical electrical capacity as a basic skeleton, and having both a high theoretical electrical capacity and a high open-circuit voltage by increasing an open-circuit voltage to a value of more than 2 V by replacing a part of manganese ions with calcium ions by adding the calcium ions. That is, a positive electrode active material for secondary batteries mainly containing a compound represented by a chemical composition formula $Li_{2-x}Mn_{1-y}Ca_yO_2$, and an electrode and a battery including the same are realized. In the formula, x satisfies $0 < x < 1.3$, and y satisfies $0.2 < y < 0.9$.

3 Claims, 3 Drawing Sheets

(51) Int. Cl.
*C01G 45/12* (2006.01)
*H01M 10/052* (2010.01)
*H01M 4/02* (2006.01)

(52) U.S. Cl.
CPC ...... *C01P 2002/77* (2013.01); *C01P 2006/40* (2013.01); *H01M 10/052* (2013.01); *H01M 2004/028* (2013.01)

(56) References Cited

U.S. PATENT DOCUMENTS

| | | | |
|---|---|---|---|
| 6,030,726 | A | 2/2000 | Takeuchi et al. |
| 6,627,351 | B1 | 9/2003 | Yamaura |
| 7,771,874 | B2 | 8/2010 | Gao et al. |
| 7,918,904 | B2* | 4/2011 | Kono ............... H01M 4/136 252/182.1 |
| 8,765,306 | B2* | 7/2014 | Amiruddin ...... H01M 4/0447 320/137 |
| 2002/0012843 | A1 | 1/2002 | Munakata et al. |
| 2006/0222952 | A1* | 10/2006 | Kono ............... H01M 4/136 429/231.95 |
| 2009/0142255 | A1 | 6/2009 | Chung et al. |
| 2011/0236751 | A1* | 9/2011 | Amiruddin ...... H01M 4/0447 429/188 |
| 2012/0308896 | A1* | 12/2012 | Asari ............... H01M 4/5825 429/231.95 |
| 2015/0180024 | A1* | 6/2015 | Nose ............... C01B 25/45 429/220 |
| 2015/0207147 | A1* | 7/2015 | Nagai ............. H01M 10/0567 429/231.95 |
| 2015/0221983 | A1* | 8/2015 | Kamiya ........... H01M 10/058 429/188 |
| 2015/0380765 | A1* | 12/2015 | Fujieda ........... H01M 10/052 429/304 |
| 2016/0006030 | A1* | 1/2016 | Saka .............. H01M 4/505 429/61 |
| 2016/0181657 | A1* | 6/2016 | Kawaji ........... H01M 10/0562 429/162 |
| 2016/0344027 | A1* | 11/2016 | Asari ............. C01G 45/1228 |

FOREIGN PATENT DOCUMENTS

| | | |
|---|---|---|
| JP | 10-321225 A | 12/1998 |
| JP | 2000-348722 A | 12/2000 |
| JP | 2001-192210 A | 7/2001 |
| JP | 2001-250552 A | 9/2001 |
| JP | 2002-008660 A | 1/2002 |
| JP | 2004-220898 A | 8/2004 |
| JP | 2013-062083 A | 4/2013 |

OTHER PUBLICATIONS

W. I. F. David et al., The crystal structure of $Li_2MnO_2$, Revue de Chimie Minerale, t. 20, 1983, pp. 636-642.

* cited by examiner

POSITIVE ELECTRODE ACTIVE MATERIAL FOR SECONDARY BATTERIES AND LITHIUM ION SECONDARY BATTERY USING THE SAME

CROSS REFERENCE TO PRIOR APPLICATIONS

This application is a U.S. National Phase application under 35 U.S.C. §371 of International Application No. PCT/JP2014/056212, filed on Mar. 10, 2014. The International Application was published in Japanese on Sep. 17, 2015 as WO 2015/136604 A1 under PCT Article 21(2). The contents of the above applications are hereby incorporated by reference.

TECHNICAL FIELD

The present invention relates to a positive electrode active material for secondary batteries and a lithium ion secondary battery using the same.

BACKGROUND ART

A lithium ion secondary battery is expected to be applied in a wide field such as an electronic device, on-vehicle use, or stationary use.

In general, as a positive electrode active material for a lithium ion battery, layered rock salt type $LiCoO_2$, spinel type $LiMn_2O_4$, or the like has been partially put into practice. When one electron reaction is assumed, the layered rock salt type $LiCoO_2$ has a theoretical electrical capacity of 273 mAh/g. The spinel type $LiMn_2O_4$ has a theoretical electrical capacity of 148 mAh/g.

NPL 1 discloses a crystal structure of $Li_2MnO_2$ having a layered structure. The space group of $Li_2MnO_2$ having a layered structure is trigonal P-3m1 (No. 164). The space group of a layered rock salt type crystal structure is R-3m (No. 160), and the space group of a spinel type crystal structure is Fd-3m (No. 227). Therefore, the crystal structure of $Li_2MnO_2$ having a layered structure is different from the structures of these positive electrode active materials.

PTL 1 describes use of $Li_2MnO_2$ having a layered structure as a positive electrode active material. When one electron reaction is assumed, $Li_2MnO_2$ having a layered structure has a theoretical electrical capacity of 530 mAh/g, larger than the theoretical electrical capacity of the layered rock salt type $LiCoO_2$ or the spinel type $LiMn_2O_4$.

PTL 2 describes that the open-circuit potential is less than 2 V in charge/discharge of $Li_2MnO_2$ having a layered structure.

CITATION LIST

Patent Literature

PTL 1: U.S. Pat. No. 7,771,874
PTL 2: U.S. Pat. No. 4,980,251

Non-Patent Literature

NPL 1: W. I. F. David, J. B. Goodenough, M. M. Thackeray, and M. G. S. R Thomas, Revue de Chimie Minerale, 20, pp. 636 (1983).

SUMMARY OF INVENTION

Technical Problem $Li_2MnO_2$ having a layered structure has a problem that the open-circuit voltage thereof is low. However, a method for increasing the open-circuit voltage has not been found.

An object of the present invention is to provide a positive electrode active material having both a high electrical capacity and a high voltage by increasing the open-circuit voltage of $Li_2MnO_2$ having a layered structure, and a lithium ion secondary battery using the same.

Solution to Problem

In order to solve the above problem, the present invention increases the open-circuit voltage by adding calcium to $Li_2MnO_2$ having a layered structure to provide a positive electrode active material having both a high theoretical electrical capacity and a high open-circuit voltage.

An example of the positive electrode active material of the present invention is a positive electrode active material for secondary batteries mainly containing a compound represented by a chemical formula $Li_{2-x}Mn_{1-y}Ca_yO_2$, having a layered crystal structure, and satisfying $0.0<x<1.3$ and $0.2<y<0.9$.

The lithium ion secondary battery of the present invention uses the above positive electrode active material for secondary batteries as a positive electrode.

Advantageous Effects of Invention

The present invention can provide a positive electrode active material having both a high theoretical electrical capacity and a high open-circuit voltage. In addition, by using the positive electrode active material, a lithium ion secondary battery having an excellent energy density can be realized.

DESCRIPTION OF EMBODIMENTS

The present inventor examined a charge/discharge mechanism of $Li_2MnO_2$ having a layered structure in detail. As a result, the present inventor has found that there is an element to increasing an open-circuit voltage. The present inventor has conceived of a method for increasing the open-circuit voltage of $Li_2MnO_2$ having a layered structure by adding the element. Hereinafter, details of the examination until this idea was reached will be described.

Figure 1:
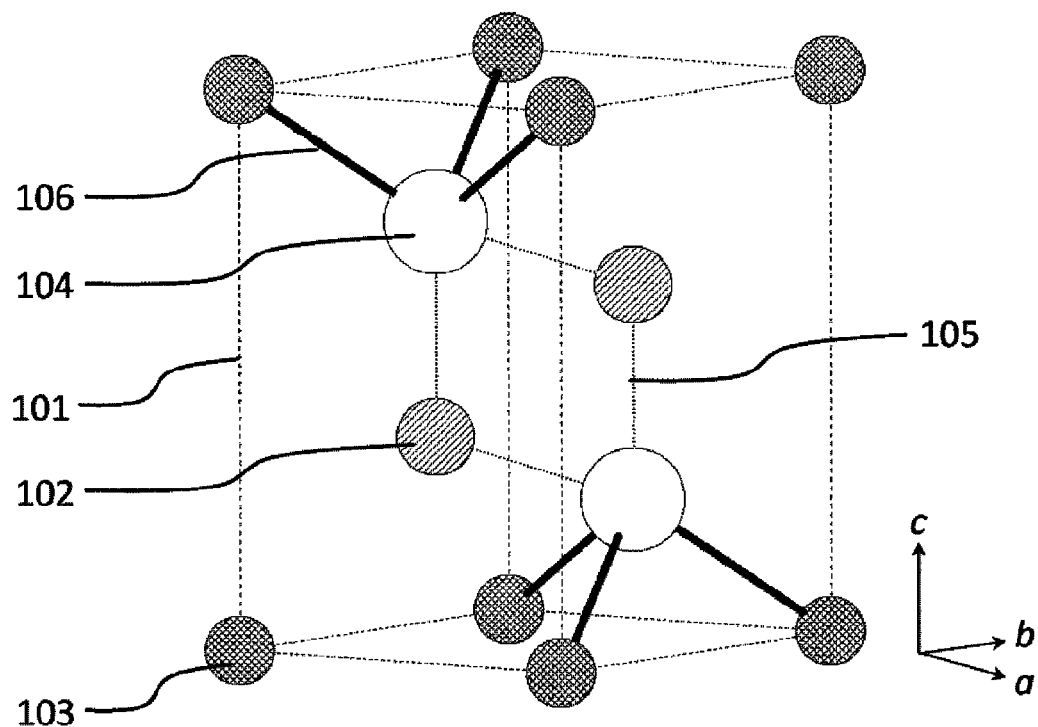
FIG. 1 is a diagram illustrating a crystal structure of $Li_2MnO_2$ having a layered structure.

First, a crystal structure of $Li_2MnO_2$ having a layered structure is illustrated in FIG. 1. The sign 101 indicates a boundary between unit cells. Periodic repetition of this structure forms a crystal structure. There are a lithium ion 102, a manganese ion 103, and an oxygen ion 104 in a unit cell. The lithium ion 102 is bonded to the oxygen ion 104 to form an ionic bond 105. The manganese ion 103 is bonded to the oxygen ion 104 to form an ionic bond 106. A reason for forming an ionic bond is as follows. That is, the lithium ion 102 is a monovalent cation, the manganese ion 103 is a divalent cation, the oxygen ion 104 is a divalent anion, and therefore a bond is formed by an electrostatic attractive force between the cation and the anion.

A relation between charge and change in crystal structure will be described. Charge in a lithium ion secondary battery is a process for eliminating a lithium ion from a positive electrode active material and inserting the lithium ion into a negative electrode active material. Therefore, a lithium ion is extracted from a crystal structure by charge. That is, a lithium ion-oxygen ionic bond in the crystal structure in FIG. 1 is broken, and the lithium ion in the crystal structure disappears. On the contrary, discharge is a process for eliminating a lithium ion from a negative electrode active material and inserting the lithium ion into a positive electrode active material. Therefore, the lithium ion returns to the positive electrode active material again by discharge. That is, the lithium ion-oxygen ionic bond in the crystal structure in FIG. 1 is formed again, and the lithium ion returns to the crystal structure.

From the above process for charge/discharge, it is considered that charge and discharge reactions of a lithium ion are reactions for breaking and forming the ionic bond 105 between the lithium ion 102 and the oxygen ion 104. Therefore, a physical quantity obtained by converting an energy of an ionic bond between a lithium ion and an oxygen ion electrically is an open-circuit voltage.

An intensity of the energy of the ionic bond between a lithium ion and an oxygen ion will be considered. The oxygen ion 104 is directly bonded to the lithium ion 102. However, the manganese ion 103 is present in a second nearest site of the lithium ion, and therefore the lithium ion 102 receives electrostatic repulsion from the manganese ion 103. Therefore, the lithium ion 102 is bonded to the oxygen ion 104, but it is considered that the energy of the ionic bond 105 becomes weaker by receiving repulsion from the manganese ion 103 in the second nearest site.

It is considered that the electronegativity of an ion in the second nearest site has an influence on electrostatic repulsion received by a lithium ion from the second nearest site. The electronegativity is an index of a strength of an atom for attracting an electron. The electronegativity of a manganese ion is 1.6. For comparison, a nickel ion and a cobalt ion which are other metal ions will be considered. The electronegativity of a nickel ion is 1.9. The electronegativity of a cobalt ion is 1.9. Therefore, it is considered that a manganese ion is more difficult to attract an electron and is charged more positively than a nickel ion or a cobalt ion. Therefore, as the electronegativity of an ion in the second nearest site is lower, the electrostatic repulsion with a lithium ion is stronger. As a result, an ionic bond between the lithium ion and an oxygen ion is weaker, and the open-circuit voltage is lower.

It is considered that the radius of an ion in the second nearest site has an influence on electrostatic repulsion received by a lithium ion from the second nearest site. A larger radius of an ion in the second nearest site makes a distance from the lithium ion longer, and makes the electrostatic repulsion weaker. On the other hand, a smaller radius of an ion in the second nearest site makes a distance from the lithium ion shorter, and makes the electrostatic repulsion stronger. Therefore, as the radius of an ion in the second nearest site is smaller, the electrostatic repulsion with a lithium ion is stronger. As a result, an ionic bond between the lithium ion and an oxygen ion is weaker, and the open-circuit voltage is lower.

From the above consideration, by replacing a part of manganese ions in the second nearest site with ions A (not Mn) by adding the ions A to $Li_2MnO_2$ having a layered structure, a possibility of achieving a higher open-circuit voltage than related art has been conceived of by utilizing the electronegativity of the ion A and a radius of an atom.

However, it is not known which ion is suitable for the ion A. Therefore, the inventor has examined which A ion is suitable by simulating addition of the A ion into a manganese site numerically by using first principle density functional theory which can very accurately reproduce the electronic structure and crystal structure of a substance based on the basic principles of quantum mechanics.

A specific method will be described. First, some candidates were selected as the A ion. According to an electroneutrality condition of a chemical formula, an ion which may become divalent is suitable as a candidate. Therefore five of Zn, Cu, Ni, Co, and Ca were used as candidates for the A. Subsequently, a half of the manganese sites in FIG. 1 was selected and was replaced with the A ions to form a crystal structure. That is, a crystal structure represented by a composition formula $Li_2Mn_{0.5}A_{0.5}O_2$ was formed. Thereafter, a lithium ion was eliminated and the open-circuit voltage was thereby calculated.

In order to check whether the calculation was performed correctly, elimination of lithium from $Li_2MnO_2$ having a layered structure was calculated. As a result, 1.85 V was obtained as an open-circuit voltage. This value is in good agreement with a fact that the open-circuit potential from $Li_2MnO_2$ having a layered structure is less than 2 V in PTL 2. It was thereby confirmed that first principle calculation was performed with extremely high accuracy.

Next, elimination of lithium from a composition formula $Li_2Mn_{0.5}A_{0.5}O_2$ was simulated. Results thereof are shown in Table 1. Table 1 shows a relation among the electronegativity of an addition element A, an atomic radius, and an open-circuit voltage by a first principle simulation. The inventor has found that an open-circuit voltage higher than $Li_2MnO_2$ having a layered structure is exhibited by selecting any ion as A. In addition, the inventor has found that an A ion exhibiting the highest open-circuit voltage is a calcium ion.

TABLE 1

| A | electronegativity (a) | atomic radius (b) | index (a) × (b) | open-circuit voltage [V] |
|---|---|---|---|---|
| Mn | 1.6 | 1.17 | 1.87 | 1.85 |
| Zn | 1.7 | 1.25 | 2.13 | 2.08 |
| Cu | 1.9 | 1.17 | 2.22 | 2.21 |
| Ni | 1.9 | 1.15 | 2.19 | 2.22 |
| Co | 1.9 | 1.16 | 2.20 | 2.24 |
| Ca | 1.3 | 1.74 | 2.26 | 2.41 |

Figure 2:
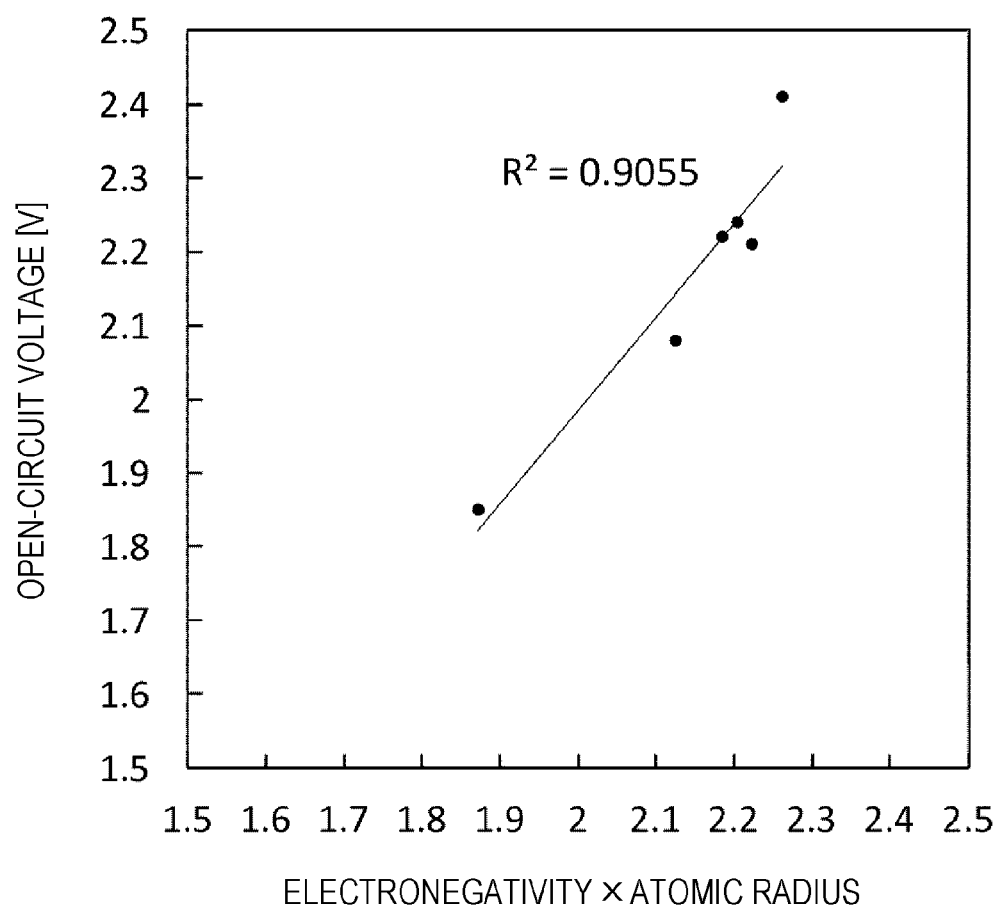
FIG. 2 is a diagram illustrating a correlation between an electronegativity and an atomic radius, and an open-circuit voltage.

FIG. 2 illustrates a correlation between the electronegativity of the ion A and an atomic radius thereof, and an open-circuit voltage. The horizontal axis indicates a product of an electronegativity and an atomic radius as an index. This is because the inventor thinks that a larger electronegativity causes a larger open-circuit voltage and a larger atomic radius causes a larger open-circuit voltage. FIG. 2 indicates that the index is in good proportion to the open-circuit voltage. A correlation coefficient is as high as 0.9055. This supports that the idea of the inventor is correct.

Figure 3:
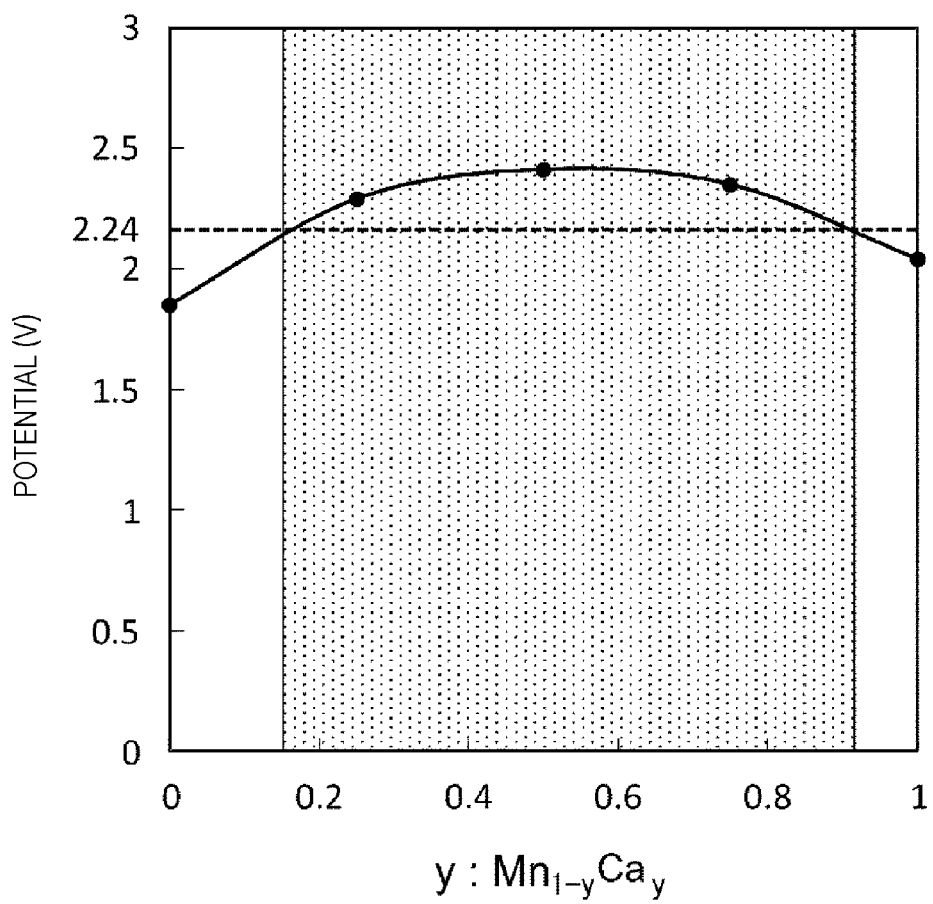
FIG. 3 is a diagram illustrating a simulation result in a range of calcium solid solution according to the present invention.

The inventors examined change in open-circuit voltage according to an addition amount of a calcium ion. Specifically, an open-circuit voltage was obtained by simulating elimination of a lithium ion by changing a value of y with respect to a composition formula $Li_2Mn_{1-y}Ca_yO_2$. Results of the simulation are illustrated in FIG. 3. An open-circuit voltage value 2.24 V obtained by adding Co was employed as a reference, and an area exhibiting an open circuit voltage higher than this value was examined to obtain a result that the value satisfying $0.2<y<0.9$ was suitable.

When a positive electrode for nonaqueous electrolyte secondary batteries is manufactured using the above positive electrode active material of the present invention, the above active material is usually only required to be used in a powder form, and the average particle diameter thereof is only required to be about 0.1 to 1 μm. The average particle diameter is a value measured, for example, using a laser diffraction particle size distribution measuring apparatus. The content of the above active material in a positive electrode is only required to be set appropriately according to the kind of a substance used, a use amount of a binder, a use amount of a conductive agent, and the like. In manufacturing a positive electrode, as long as a predetermined positive electrode characteristic is obtained as a positive electrode active material, the above active material alone or a mixture with another conventionally-known positive electrode active material maybe used.

The positive electrode of the present invention is only required to be manufactured according to a publicly-known method for manufacturing a positive electrode, in addition to use of the above positive electrode active material. For example, it is only required to mix the above powdered active material with a publicly-known binder (polytetrafluoroethylene, polyvinylidene fluoride, polyvinyl chloride, ethylene propylene diene polymer, styrene butadiene rubber, acrylonitrile butadiene rubber, fluorine-containing rubber, polyvinyl acetate, polymethyl methacrylate, polyethylene, nitrocellulose, or the like), if necessary, and to further mix the resulting mixed powder with a publicly-known conductive material (acetylene black, carbon, graphite, natural graphite, artificial graphite, needle coke, carbon nanotube, carbon nanohorn, graphene nanosheet, or the like), if necessary. Thereafter, it is only required to subject the resulting mixed powder to pressure bonding-molding on a stainless steel support or the like, or to fill the resulting mixed powder into a metal container. Alternatively, for example, the electrode of the present invention can be manufactured by a method for applying a slurry obtained by mixing the above mixed powder with an organic solvent (N-methylpyrrolidone, toluene, cyclohexane, dimethylformamide, dimethylacetamide, methyl ethyl ketone, methyl acetate, methyl acrylate, diethyl triamine, N-N-dimethylaminopropyl amine, ethylene oxide, tetrahydrofuran, or the like) on a metal substrate such as aluminum, nickel, stainless steel, or copper.

A negative electrode is formed by applying a negative electrode mixture on a current collector made of copper or the like. The negative electrode mixture includes an active material, a conductive material, a binder, and the like. As the active material of the negative electrode, metal lithium, a carbon material, and a material capable of inserting lithium or forming a compound can be used. The carbon material is particularly suitable. Examples of the carbon material include a graphite such as a natural graphite or an artificial graphite, and an amorphous carbon such as a coal-based coke, a carbide of a coal-based pitch, a petroleum-based coke, a carbide of a petroleum-based pitch, or a carbide of a pitch coke. It is preferable to use the above carbon materials subjected to various surface treatments. One kind of these carbon materials can be used singly, or two or more kinds thereof can be used in combination thereof. Examples of the material capable of inserting lithium or forming a compound include a metal such as aluminum, tin, silicon, indium, gallium, or magnesium, an alloy containing these elements, and a metal oxide containing tin, silicon, or the like. In addition, examples thereof include a composite material between the above metal, alloy, or metal oxide and a graphite carbon material or an amorphous carbon material.

Figure 4:
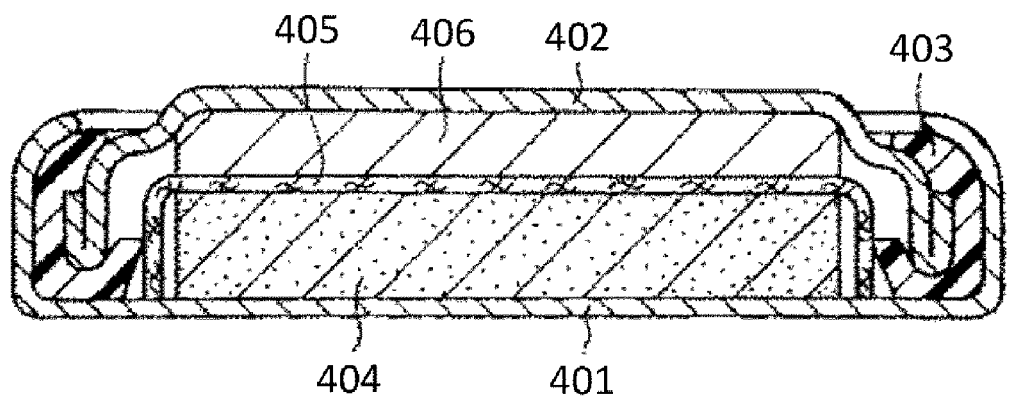
FIG. 4 is a longitudinal cross sectional view of a coin type lithium ion secondary battery.

FIG. 4 is a longitudinal cross sectional view of a coin type lithium ion secondary battery as a specific example of the battery according to the present invention. In the present Example, a battery having a diameter of 6.8 mm and a thickness of 2.1 mm was manufactured. In FIG. 4, a positive electrode can 401 acts also as a positive electrode terminal, and is made of stainless steel having excellent corrosion resistance. A negative electrode can 402 acts also as a negative electrode terminal, and is made of stainless steel of the same material quality as the positive electrode can 401. A gasket 403 insulates the positive electrode can 401 from the negative electrode can 402, and is made of polypropylene. A contact surface between the positive electrode can 401 and the gasket 403 and a contact surface between the negative electrode can 402 and the gasket 403 are coated with a pitch. A separator 405 made of a polypropylene nonwoven fabric is disposed between a positive electrode pellet 404 and a negative electrode pellet 406. The separator 405 is impregnated with an electrolytic solution at the time of installation thereof.

The shape of a secondary battery is not limited to a coin shape, but may be a cylindrical shape by winding an electrode, and for example, a 18650 type may be used. A rectangular shape obtained by laminating electrodes may be used.

Hereinafter, the present invention will be described more specifically with Examples, but is not thereby limited in any way. In Examples, a battery was manufactured and measured in a dry box in an argon atmosphere. First, a battery was discharged, and was subsequently charged and discharged.

EXAMPLE 1

Powdered Electrolytic manganese dioxide (γ-$MnO_2$, purity 69.44%), powdered calcium oxide (CaO, purity 95.31%), and lithium hydroxide (LiOH, purity 60.1%) are filled into a wet grinder at a ratio of Li:Mn:Ca=4:1:1, and pure water is added thereto such that the solid concentration of a slurry is 30% by weight. The resulting mixture is treated using beads of 1.00 mmφ at a rotational speed of 2500 rpm for one hour. Pure water is added thereto to prepare a mixture dispersion for spray-drying having a solid concentration of 20% by weight.

Subsequently, the mixture dispersion for spray-drying is subjected to spray-drying using a spray dryer. Drying conditions of the spray dryer are a hot air inlet temperature of 200° C. and an outlet temperature of 100° C. The resulting dry powder is fired in the atmosphere using a microwave heating device at 1200° C. for ten minutes. As a result, lithium manganese calcium composite oxide particles having a layered structure having a composition of Li:Mn:Ca=1.97:0.53:0.47 are obtained.

Subsequently, the lithium manganese calcium composite oxide particles are put into a mixer, and are pulverized for 30 seconds. Subsequently, the lithium manganese calcium composite oxide particles are classified for one minute using an electromagnetic sieve shaker under conditions of a sieve opening of 45 μm and an amplitude of 3.0 mm, and undersize particles are collected to prepare lithium manganese calcium composite oxide particles for a positive electrode.

An X-ray diffraction pattern of the fired particles is examined, and a space group thereof belongs to a trigonal P-3m1 (No. 164). This indicates that a part of manganese sites in $Li_2MnO_2$ having a layered structure is occupied by calcium ions to form $Li_2Mn_{0.5}Ca_{0.5}O_2$.

A positive electrode pellet is formed using the positive electrode active material, and a coin type lithium ion secondary battery as illustrated in FIG. 4 is assembled. By performing a charge/discharge test at a cutoff potential of 4.0 V or 1.0 V, a discharge capacity of 170 mAh/g can be confirmed at a discharge potential of 2.4 V. An effect of the present invention can be confirmed because the discharge potential is more than 2 V.

EXAMPLE 2

A liquid in which 200 g of lithium carbonate is suspended in 600 mL of pure water is prepared. The pH thereof is adjusted to 7.5 by blowing carbon dioxide gas thereinto. Meanwhile, a solution in which 110 g of manganese chloride and 100 g of calcium chloride are dissolved in 300 mL of pure water is prepared. This solution was dropwise added to prepare a carbonate containing lithium, manganese, and calcium (mixture of lithium carbonate, manganese carbonate, and calcium carbonate).

The carbonate is washed and filtered with a lithium carbonate saturated solution such that lithium carbonate is not eluted, and is dried with hot air at 100° C.

The temperature of this carbonate as a raw material was raised from room temperature to 490° C. over two hours, was held at 490° C. for three hours, and then was raised to 600° C. over four hours in a dry air. The carbonate was allowed to stand at the temperature for 24 hours, and then was cooled naturally to obtain a lithium manganese composite oxide represented by a general formula $Li_{2-x}Mn_{1-y}Ca_yO_2$ (in the formula, 0<x<1.3 and 0.2<y<0.9).

EXAMPLE 3

Sulfates of Co, Mn, and Ni are used as raw materials to prepare a carbonate precursor by a reaction crystallization method. In one particle of the carbonate precursor, each element is dispersed uniformly. Lithium carbonate is mixed therewith, and then the resulting mixture is fired at 900° C. for four hours to obtain a positive electrode active material represented by $Li(Li_{0.1}Mn_{0.3}Ni_{0.3}Co_{0.3})O_2$.

Meanwhile, the powdered lithium manganese composite oxide prepared in Example 2 is prepared and mixed with the above positive electrode active material $Li(Li_{0.1}Mn_{0.3}Ni_{0.3}Co_{0.3})O_2$, and the resulting mixture is fired in the air at 800° C. for eight hours. $Li_{2-x}Mn_{1-y}Ca_yO_2$ in close contact with $Li(Li_{0.1}Mn_{0.3}Ni_{0.3}Co_{0.3})O_2$ can be thereby prepared. By electron microscopy, it has been confirmed that a surface of $Li(Li_{0.1}Mn_{0.3}Ni_{0.3}Co_{0.3})O_2$ is covered with $Li_{2-x}Mn_{1-y}Ca_yO_2$.

When a discharge test of the present active material is performed, a discharge curve characteristic of $Li(Li_{0.1}Mn_{0.3}Ni_{0.3}Co_{0.3})O_2$ appears in a range of 4 V to 3 V, but a 2.4 V plateau characteristic of $Li_{2-x}Mn_{1-y}Ca_yO_2$ appears in a range of 3 V or less.

A positive electrode pellet is formed using the present positive electrode active material having a surface thereof covered with $Li_{2-x}Mn_{1-y}Ca_yO_2$, and a coin type lithium ion secondary battery as illustrated in FIG. 4 can be assembled.

REFERENCE SIGNS LIST

101 boundary between unit cells
102 lithium ion
103 manganese ion
104 oxygen ion
105 bonding between lithium and oxygen
106 bonding between manganese and oxygen
401 positive electrode can
402 negative electrode can
403 gasket
404 positive electrode pellet
405 separator
406 negative electrode pellet

The invention claimed is:

1. A positive electrode active material for secondary batteries comprising a compound represented by a chemical formula $Li_{2-x}Mn_{1-y}Ca_yO_2$, having a layered crystal structure, and satisfying 0.0<x<1.3 and 0.2<y<0.9, wherein the compound has a trigonal crystal structure belonging to a space group P-3m1.

2. The positive electrode active material for secondary batteries according to claim 1, wherein y is 0.5.

3. A positive electrode active material for secondary batteries, wherein a surface of the positive electrode active material is covered with a compound represented by a chemical formula $Li_{2-x}Mn_{1-y}Ca_yO_2$, having a layered crystal structure, and satisfying 0.0<x<1.3 and 0.2<y<0.9, wherein the compound has a trigonal crystal structure belonging to a space group P-3m1.

* * * * *